United States Patent
Rasmussen et al.

(10) Patent No.: US 11,079,187 B2
(45) Date of Patent: Aug. 3, 2021

(54) MODULAR HEAT EXCHANGE TOWER AND METHOD OF ASSEMBLING SAME

(71) Applicant: SPX COOLING TECHNOLOGIES, INC., Overland Park, KS (US)

(72) Inventors: Eric Rasmussen, Overland Park, KS (US); Mark Davison, Overland Park, KS (US); Dustin Jenkins, Olathe, KS (US); John Dalton, Liberty, MO (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 317 days.

(21) Appl. No.: 16/202,529

(22) Filed: Nov. 28, 2018

(65) Prior Publication Data
US 2019/0170459 A1    Jun. 6, 2019

Related U.S. Application Data

(60) Provisional application No. 62/593,351, filed on Dec. 1, 2017.

(51) Int. Cl.
| | |
|---|---|
| *F28F 25/10* | (2006.01) |
| *F28C 1/02* | (2006.01) |
| *F28F 25/04* | (2006.01) |
| *E04H 5/12* | (2006.01) |
| *F28F 25/06* | (2006.01) |

(52) U.S. Cl.
CPC ............ *F28F 25/10* (2013.01); *E04H 5/12* (2013.01); *F28C 1/02* (2013.01); *F28F 25/04* (2013.01); *F28F 25/06* (2013.01)

(58) Field of Classification Search
CPC .... E04H 5/12; F28C 1/02; F28F 25/04; F28F 25/06; F28F 25/10

USPC .......... 261/23.1, 30, 112.1, DIG. 11
See application file for complete search history.

(56) References Cited

U.S. PATENT DOCUMENTS

| | | | | |
|---|---|---|---|---|
| 2,680,603 | A * | 6/1954 | Taylor | F28F 9/22 261/22 |
| 3,363,885 | A * | 1/1968 | Meek | F28C 1/04 261/30 |
| 4,913,710 | A | 4/1990 | Reverdv | |
| 5,227,095 | A * | 7/1993 | Curtis | F28C 1/02 261/111 |
| 6,497,401 | B2 * | 12/2002 | Flaherty | F28C 1/00 261/109 |
| 10,113,326 | B2 * | 10/2018 | Maurer | E04B 1/34861 |
| 10,254,057 | B2 * | 4/2019 | Speckin | F28F 9/002 |
| 2006/0060993 | A1 | 3/2006 | Mockry et al. | |

(Continued)

FOREIGN PATENT DOCUMENTS

| | | |
|---|---|---|
| CH | 681821 A5 * | 5/1993 |
| CN | 106288850 A | 1/2017 |
| JP | 57-142483 | 9/1982 |

OTHER PUBLICATIONS

International Search Report and Written Opinion issued in PCT/US2018/062716, dated Feb. 6, 2019.

*Primary Examiner* — Charles S Bushey
(74) *Attorney, Agent, or Firm* — BakerHostetler

(57) ABSTRACT

The present disclosure relates to a modular heat exchange tower that has a plurality of air inlet modules each having stanchion disposed therein. The modular heat exchange tower also includes a series of heat exchange modules positioned above the air inlet modules along with a series of plenum modules position above the heat exchange modules.

20 Claims, 19 Drawing Sheets

(56) References Cited

U.S. PATENT DOCUMENTS

2017/0037650 A1     2/2017  Maurer et al.
2017/0343306 A1*   11/2017  Speckin .................... E04H 5/12
2019/0024992 A1*    1/2019  Curtis ....................... F28C 1/02

* cited by examiner

MODULAR HEAT EXCHANGE TOWER AND METHOD OF ASSEMBLING SAME

CROSS-REFERENCE TO RELATED APPLICATIONS

This application claims priority to U.S. provisional patent application entitled "MODULAR HEAT EXCHANGE TOWER AND METHOD OF ASSEMBLING SAME", filed Dec. 1, 2017, having Ser. No. 62/593,351, the disclosure of which is hereby incorporated by reference in its entirety.

FIELD OF THE INVENTION

The present disclosure relates generally to modular heat exchange towers. The present disclosure also relates to methods of assembling modular heat exchange towers. More particularly, the present disclosure relates, for example, to factory assembled modular air inlets and modular components of heat exchange towers, that can be pre-assembled in a factory setting and transported to a job site and assembled to erect a cooling tower.

BACKGROUND OF THE INVENTION

Cooling towers are heat exchangers of a type widely used to emanate low grade heat into the atmosphere and are typically utilized in electricity generation, air conditioning installations, and the like. These towers receive a relatively warm or hot fluid, and pass the fluid through the tower apparatus so that heat is extracted from the fluid by interaction with relatively cooler ambient air.

Cooling towers generally include counter-flow type cooling towers and cross-flow type cooling towers. In a counter-flow cooling tower, liquid of high temperature is cooled as it flows downwards through fill or packing and is brought into contact with air traveling upwards. Conversely, in a cross-flow cooling tower, liquid of high temperature is cooled with air that moves horizontally through the fill or packing. The heated air is exhausted into the atmosphere using a fan, blower, or other such air moving device, and the cooling liquid is collected in a basin situated below the fill or packing.

Liquid is generally distributed through a cooling tower in one of two ways: gravity and spray. Typically, gravity systems are used in cross-flow cooling towers, and spray systems are used in counter-flow cooling towers. In a spray system, liquid of high temperature is distributed through the cooling tower using a series of spray nozzles mounted on distribution pipes. The spray nozzles are arranged to evenly distribute the liquid over the top of the fill. Once the liquid travels through the fill, it is collected at the bottom of the tower in a cold liquid basin. In a gravity system, liquid of high temperature is fed into a hot liquid basin disposed above the fill. The liquid then travels through holes or openings in the bottom of the hot liquid basin to the fill. Similar to the spray system, liquid that travels through the fill is collected at the bottom of the tower in a cold liquid basin.

A drawback associated with current cooling towers is that in some applications they can be very labor intensive in their assembly at the job site especially large, field erected cooling towers. The assembly of such towers oftentimes requires a dedicated labor force investing a large amount of hours. Accordingly, such assembly is labor intensive requiring a large amount of time and therefore can be costly. Uncertainties such as weather and site conditions may also affect the time required to assemble cooling towers at a job site. The quality of the labor force may also lead to quality and performance issues associated with the towers. Thus, it is desirable to assemble as much of the tower structure at the manufacturing plant or facility, prior to shipping it to the installation site.

But while it may be desirable to assemble tower components at a factory, conventional designs for cooling towers oftentimes necessitate their assembly at a job site. For example, the size of the various tower component assemblies may limit their ability to be manufactured at the factory and transported onsite. On the other hand, factory assembled cooling towers can be costly due to shipping inefficiencies as well as difficulties in such areas as the sealing of the modular joints.

Therefore, it is desirable to have a cooling tower that is assembled using components that can be manufactured in a factory and transported to a job site. In particular, it is desirable to have a cooling tower that can be assembled with modular components, including components that have pre-assembled modular air inlets that allow for maximum shipping efficiency.

SUMMARY OF THE INVENTION

Embodiments of the present disclosure advantageously provide for modular heat exchange towers and methods of assembling such modular heat exchange towers.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

Figure 1:
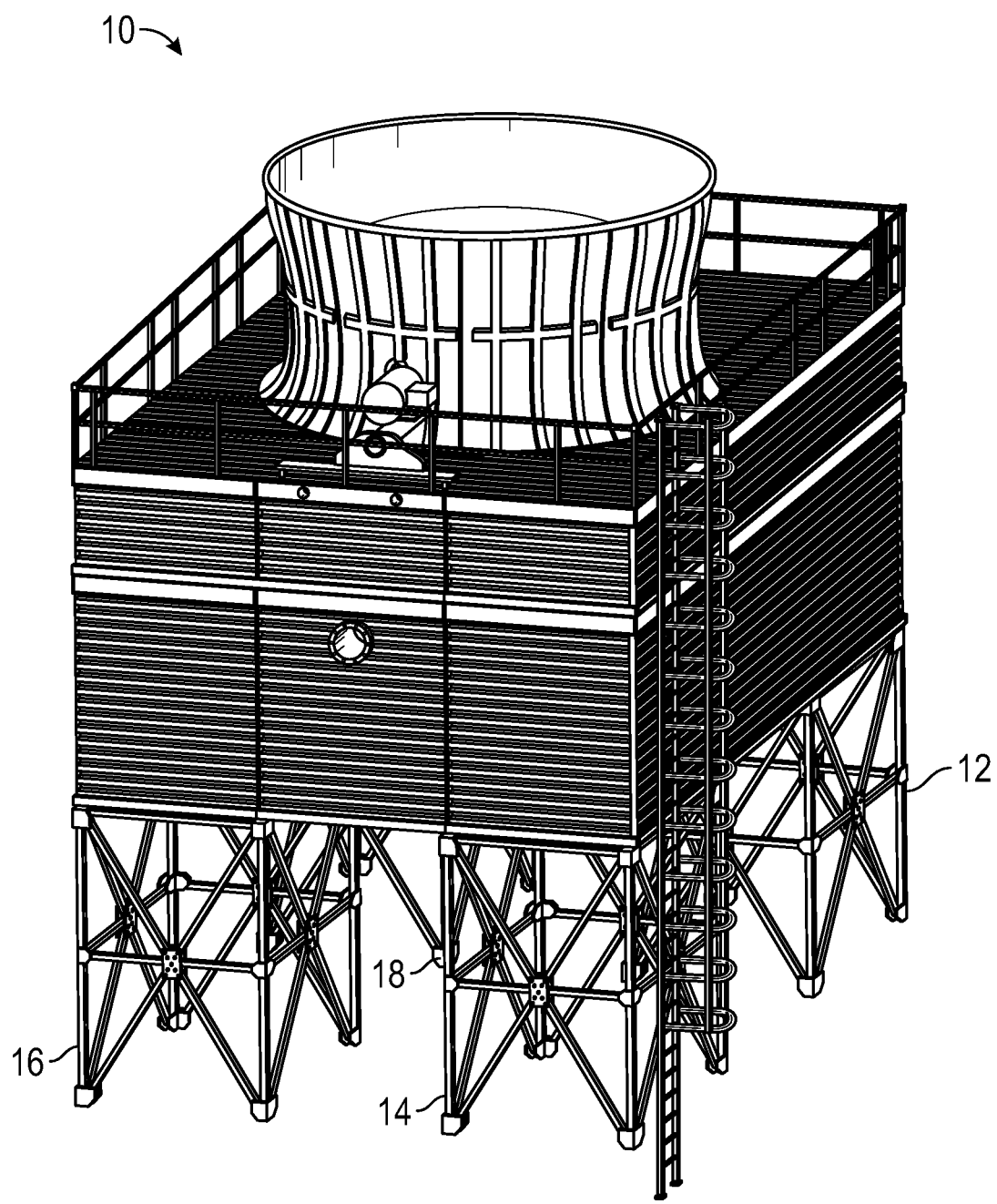
FIG. 1 is an isometric view of a first exemplary modular heat exchange tower in accordance with an embodiment of the present invention.

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Cooling towers regulate the temperature of relatively warm or hot fluid by passing the fluid through a tower apparatus that brings it into contact with relatively cooler ambient air. These towers typically include a hot liquid distribution system. Examples of these distribution systems may have a series of water distribution nozzles or an apertured distribution basin or the like, and a cold water collection basin positioned at the base or bottom of the cooling tower. The aforementioned fill structure oftentimes includes either a plurality of elongated, horizontally arranged and staggered splash bars supported at spaced intervals by an upright grid structure or frame assembly, or a series of fill packs or fill packing composed of a number of film fill sheets. During assembly of the evaporative cooling towers, typically, an outer shell or support structure is built first and then the fill media is installed. In the case of splash type fill, a rack or grid support is affixed to the support shell. Splash bars are then threaded into the rack. The splash bars generally provide a surface for consistent, predictable dispersal and breakup of the water droplets over a range of water loadings typically encountered during operation of the evaporative cooling tower. Typically, these splash bars are long and thin and the fill structure includes a great number of them. In the case of film fill, fill packs may be employed and installed into the support structure of the cooling tower. Fill packs may consist of individual sheets glued or attached by some other means to one another to make blocks. Alternatively, fill packs may consist of sheets hung from support members. Successive sheets are pushed on support members from one end and push down the support member until the support member is populated with the desired number of sheets. The fill packs are then placed in the support structure.

In a counter-flow tower, hot liquid is distributed over the fill section such that it comes into contact with cooler ambient air, which cools the hot liquid as the air travels vertically through the fill section. These towers typically include an air inlet region that is disposed below the fill section, which allows air from outside of the tower to travel into the fill section. The tower also includes a plenum area or plenum chamber for receiving the air after it has travelled through the fill section, and a fan or other air current generator for directing the air into the atmosphere once again.

Hot liquid may be distributed in a cooling tower using a pipe distribution system. A pump may feed water into the pipes, which carry the water to nozzles that eject the water onto the fill section. The ejected water then travels through the fill section and is collected at the bottom in a cold liquid basin, which may have an opening (e.g., a pipe opening) for passing the cold liquid out of the cooling tower. As an alternative to a pipe distribution system, hot liquid may also be distributed in a cooling tower using water distribution basins having apertures for the water to flow through onto the fill section. Such as system is known as a gravity-driven distribution system. Once the liquid flows through the fill section and is cooled, it is similarly collected by a cold water basin, which may eject the cooled liquid to the outside.

Systems and methods disclosed herein provide a modular cooling tower with a modular air inlet design. The modular air inlet design allows for the separate inlets to be pre-assembled in a factory and transported to a job site for installation when erecting a cooling tower. Each of the modular air inlets have dimensions that allow it to be economically transported to a job site. The aforementioned air inlet design allows the cooling tower to be sub-assembled with air flow inlets and other component-assemblies prior to shipping. As such, such systems and methods provide customers with a high capacity cooling product that requires less on-site assembly time and laydown space and reduces, installed product costs, safety concerns associated with on-site assembly, and downtime.

Systems and methods disclosed herein avoid the likelihood of transportation problems associated with existing cooling towers by providing a cooling tower that is wherein its components are pre-factory assembled. For example, systems and methods disclosed herein provide a cooling tower having four (4) modular air inlets along with three (3) heat exchange components and three plenum components. In an embodiment of the present invention, the air inlet modules are transported by utilizing the unused portion or space of the transport vehicle.

Figure 2:
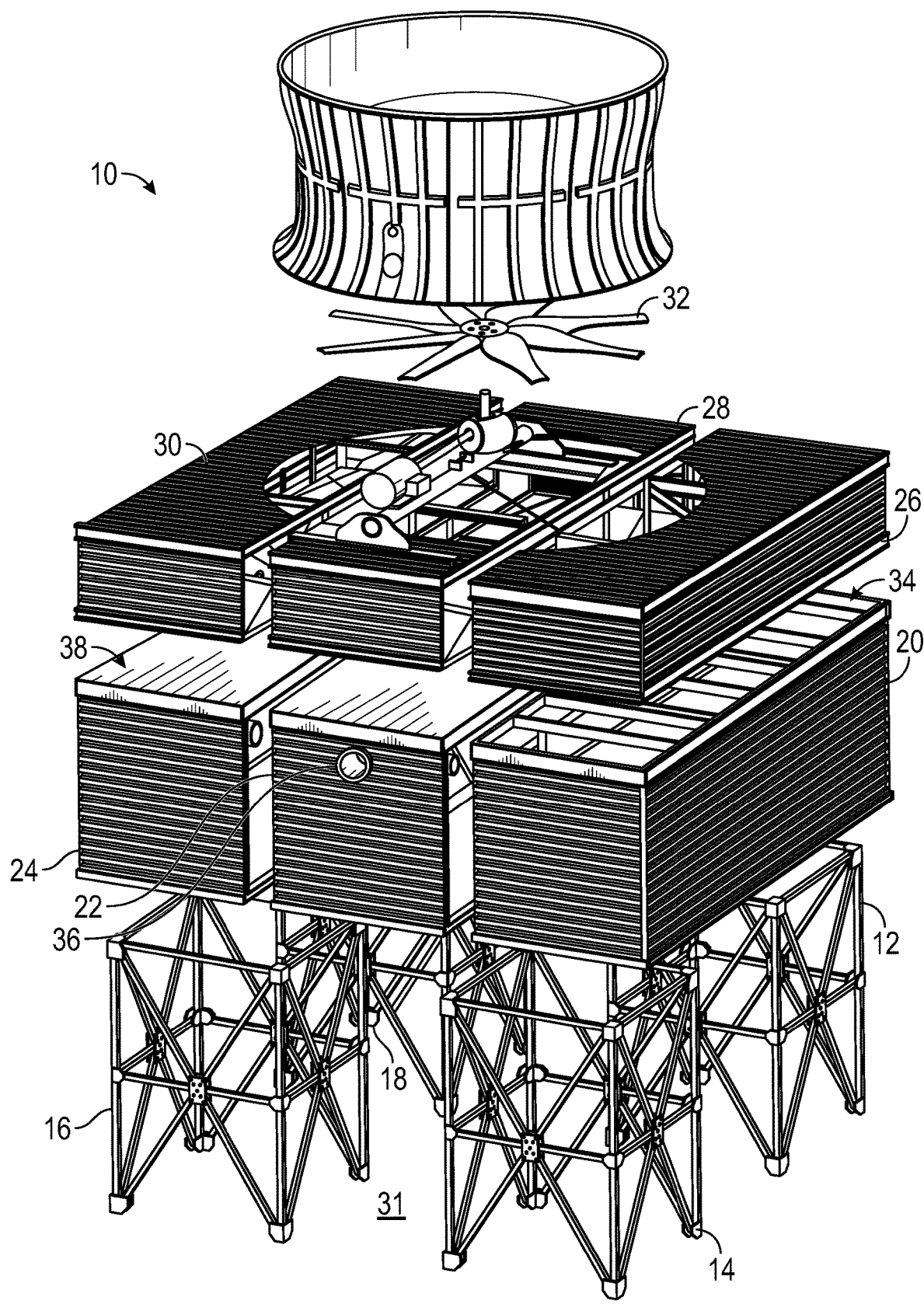
FIG. 2 is an exploded view of the modular heat exchange tower depicted in FIG. 1 showing a plurality of modular components of the modular heat exchange tower in accordance with an embodiment of the present invention.

Referring now to FIGS. 1 and 2, a first exemplary modular heat transfer tower 10 is depicted. Whereas FIG. 1 provides an overall view of the modular heat transfer tower, FIG. 2 provides an exploded view of the modular heat transfer tower 10. The modular heat transfer tower 10 may be, for example, a cooling tower, a fluid cooler, an evaporative condenser or the like. In the embodiment depicted, the modular heat transfer tower 10 comprises of ten (10) modules including: a first air inlet module or stanchion 12, a second air inlet module or stanchion 14, a third air inlet module or stanchion 16, a fourth air inlet module or stanchion 18, a first heat exchange module 20, a second heat exchange module 22, a third heat exchange module 24, a first, plenum module 26, second plenum module 28 having an air current generator disposed therein and a third plenum module 30. The modular heat transfer tower 10 may also comprise a water basin components or modules that will be discussed further below.

Figure 3:
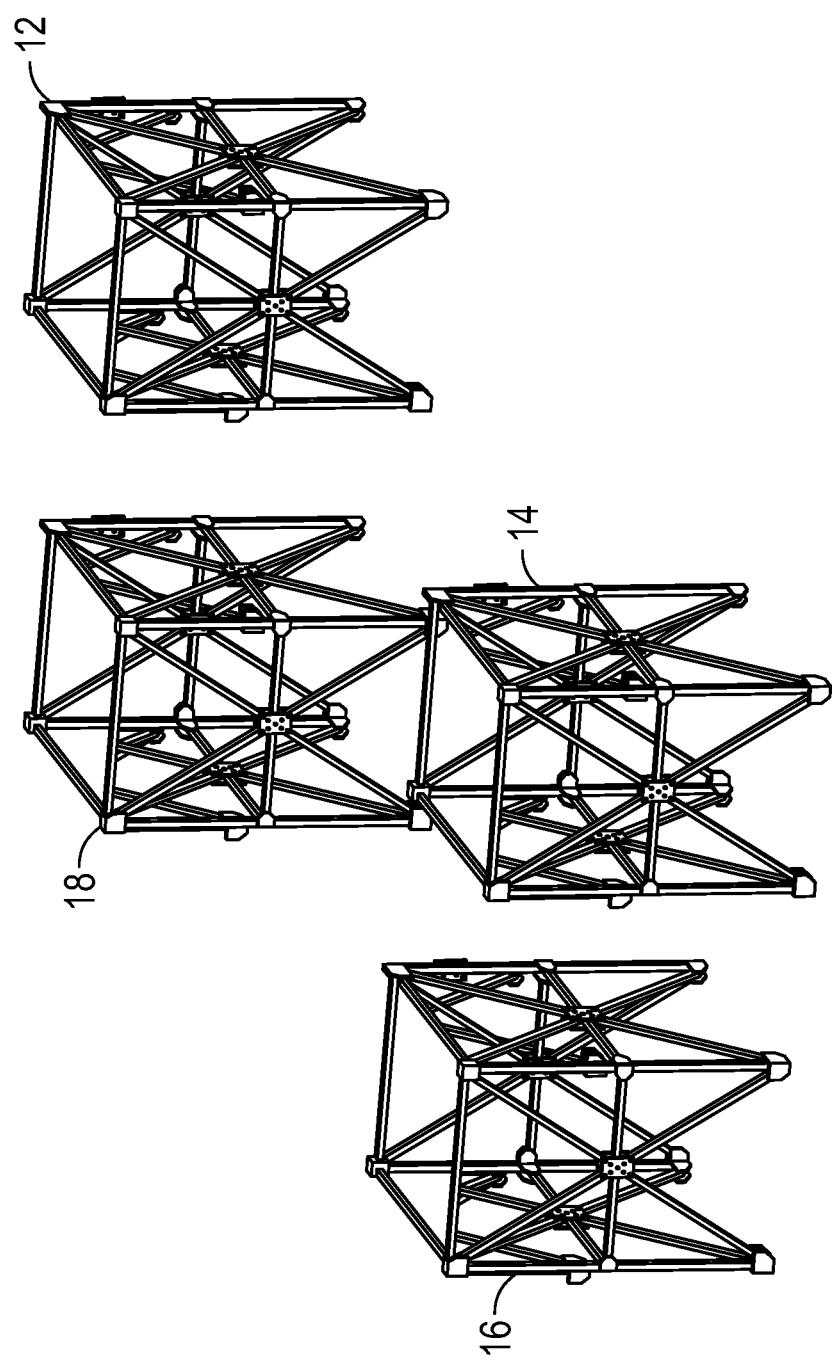
FIG. 3 is a top, isometric view of modular heat exchange tower modular air inlets in accordance with an embodiment of the present invention.
Figure 4:
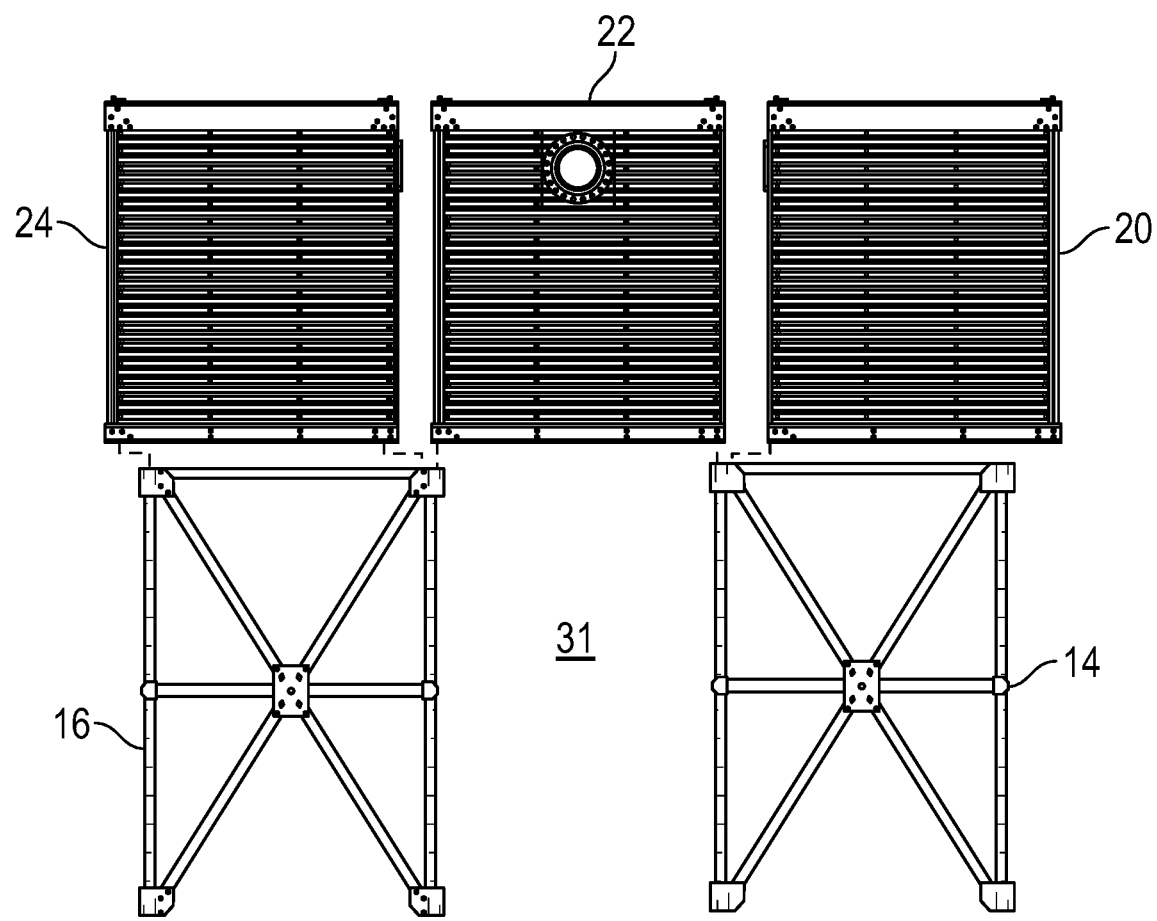
FIG. 4 is a side, exploded view of the of the fill module placement of the modular heat exchange tower depicted in FIG. 1 in accordance with an embodiment of the present invention.

Turning now to FIG. 3, the air inlet modules 12, 14, 16, 18 are illustrated in more detail. The air inlet modules 12, 14, 16, 18 are, in one embodiment, independent stanchions that are factory assembled and then shipped to the cooling tower site for cooling tower erection. Each of the air inlet modules 12, 14, 16, 18 is comprised of transverse and longitudinal framing consisting of columns and girts. While the air inlet modules 12, 14, 16, 18 are not interconnected to one another in the illustrated embodiment, said modules may be attached or interconnected in another embodiment encompassed by the present invention, e.g., for high seismic applications. The air inlet modules 12, 14, 16, 18 may however be efficiently anchored to a cold water basin, for example, and the heat exchange modules positioned on top afterward. As can be seen in FIG. 4, a schematic side view of the heat exchange module placement 20, 22, 24 on the air inlet module stanchions 14, 16, as previously mentioned above is illustrated. As the name suggests, the air inlet modules are designed such that they allow air from outside of the modular heat transfer tower 10 to travel into the modular heat transfer tower 10 or, specifically, to travel into the heat exchange modules 20, 22, 24.

As illustrated in FIGS. 1-4, the first heat exchange module 20 is positioned on, and spans the first and second modular air inlet modules 12, 14. The second heat exchange module 22 is positioned over the air inlet plenum 31 and spans all four air inlet modules 12, 14, 16, 18 where it is attached to each of said air inlet modules 12, 14, 16, 18. The third heat exchange module 24 is positioned on and spans the third and fourth modular air inlet modules 16, 18. In a separate layer, specially a top layer, the first, plenum module 26, the second plenum module 28 and the third plenum module 30 are disposed. The first plenum module 26 may be disposed above the first heat exchange module 20 or, in other words, the plenum module 26 may be disposed vertically adjacent to the first heat exchange module 20. And the third plenum module 30 may be disposed above the third heat exchange module 24 or, in other words, the third plenum module 30 may be disposed vertically adjacent to the third heat exchange module 24. The heat exchange modules 20, 22, 24 may be disposed vertically adjacent to the air inlet modules 12, 14, 16, 18 in a longitudinal direction.

Turning to the second plenum module 28, it is disposed vertically adjacent to the second heat exchange module 22. The second plenum module 28 may comprise hollow chambers for receiving air travelling through the heat exchange modules 20, 22, 24 from outside of the modular heat transfer tower 10. The second plenum module 28 may also include a supporting framework for retaining a fan cylinder and a fan 32. The fan 32 may be an example of an air current generator, such as a fan or impeller. During operation, the fan 32 pulls the air that travels through the air inlet modules 12, 14, 16, 18, into and through the heat exchange modules 20, 22, 24 from the outside atmosphere, into second plenum module 28 and back out into the atmosphere. Once erected the fan blades extend over adjacent plenum modules. Not all the blades can be placed on the fan hub for shipping as the shipping width would be excessive. Thus at least some of the fan blades must be assembled to the fan hub at the erection site. Alternatively, all the blades may be assembled to the fan hub at the erection site.

The modular heat transfer tower 10 employs a liquid distribution system that may comprises a series of hot water basins or troughs, or a series of conduits and nozzles through which liquid to be cooled flows. The embodiment of the present invention employs liquid distribution system comprising a series of conduits and nozzles. As illustrated, in FIG. 2, a first distribution assembly 34 is disposed in the first heat exchange module 20, a second liquid distribution assembly 36 is disposed in the second heat exchange module 22 and a third liquid distribution assembly 38 is disposed in the third heat exchange module 24. More specifically, the first liquid distribution assembly 34 is disposed in a top portion of the first heat exchange module 20, the second liquid distribution assembly 36 is disposed in a top portion of the second heat exchange module 22 and the third liquid distribution assembly 38 is disposed in a top portion of the third heat exchange module 24. Each of the liquid distribution assemblies comprise a plurality of nozzles 38 configured to spray liquid into lower regions of the modular heat transfer tower 10, specifically, into fill portions or sections disposed in the heat exchange modules 20, 22, 24. All three distribution assemblies 34, 36, 38 are coupled together at the erection site to form a unified water distribution system requiring one liquid inlet supply connection.

Not specifically illustrated in FIG. 2 for clarity of the liquid distribution assemblies, the heat exchange modules each include a series of drift eliminators; first, second and third eliminators which correspond with each heat each exchange module along with the first, second and third fill sections, respectively. The drift eliminators are located above liquid distribution assemblies with the top of the eliminators being nearly flush with the top of the heat exchange modules. This is more succinctly seen in the top illustration of FIG. 10 where the second eliminators are designated 404. The aforementioned fill structure oftentimes includes either a plurality of elongated, horizontally arranged and staggered splash bars supported at spaced intervals by an upright grid structure or frame assembly, or a series of fill packs or fill packing composed of a number of film fill sheets. While the heat exchange modules are described as containing fill one of ordinary skill in the art would appreciate that the heat exchange modules may comprise other heat exchange means, such as, for example, closed circuit coils or tube bundles.

Figure 5:
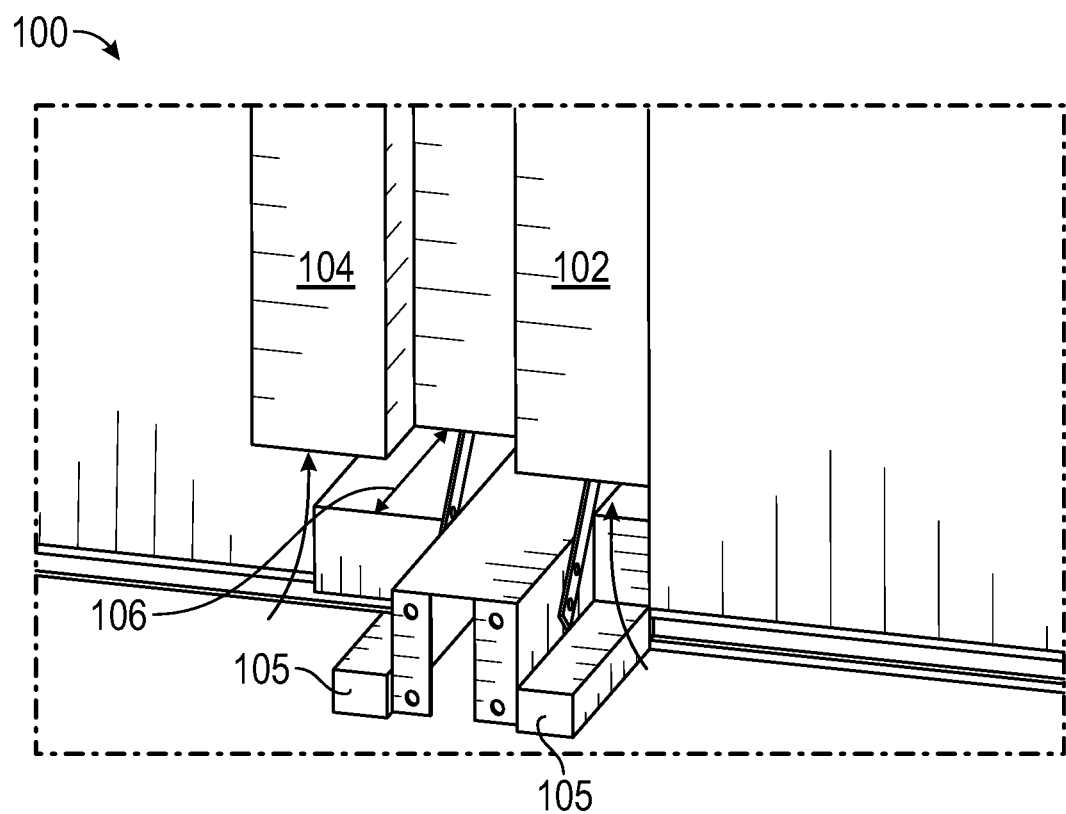
FIG. 5 is a side, perspective view of the elevated fill of the modular heat exchange tower in accordance with an embodiment of the present invention.

Turning now to FIG. 5, a side, isometric view of a step up feature, generally designated 100, is depicted that assists in avoiding air flow blockage. As the name suggests, the fill packs 102, 104 are elevated or "stepped up" a desired height, e.g., six inches (6"). Such a step 106 may be achieved, for example, by utilizing intermittent supports that are positioned on two feet (2') centers. These intermittent supports rest on top of heat exchange module support frame members 105. Each module must have independent intermittent supports. This step up, allows the flow of air, as indicated by the arrows, to reach the interior fill packs (not pictured) due to the step up in fill height. This design is desirable as fill sheets running parallel to and resting on module support frame members 105 can block substantially all the air entering the interior sheets significantly reducing the cooling capacity of the tower.

Figure 6:
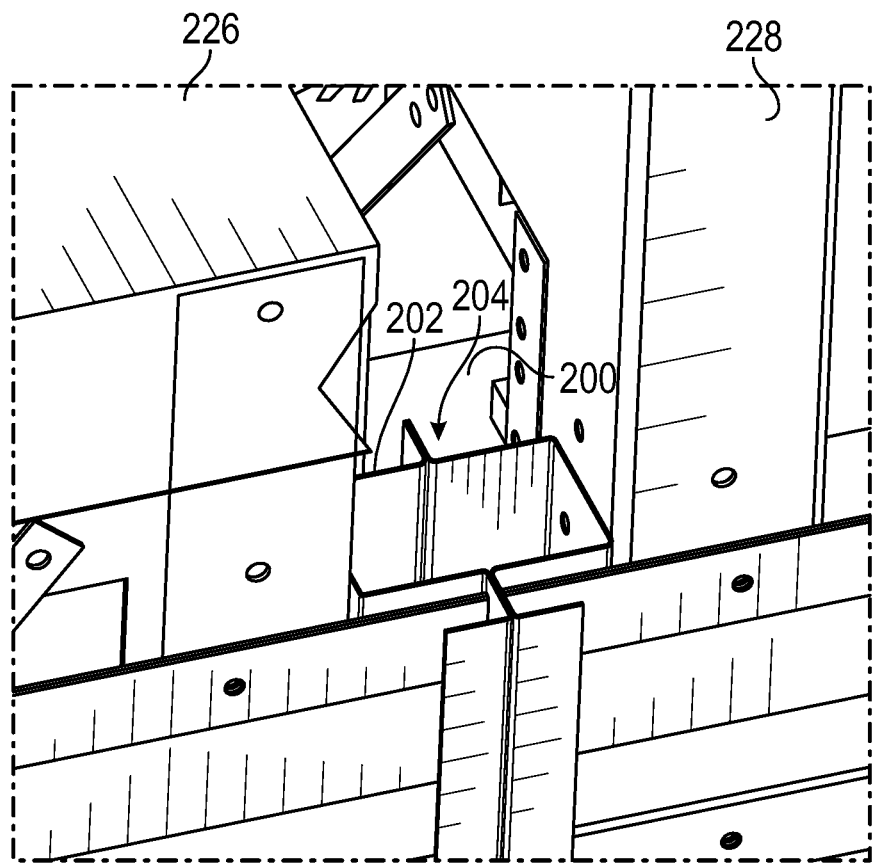
FIG. 6 is a side, perspective view of a tower side casing seal in accordance with an embodiment of the present invention.
Figure 7:
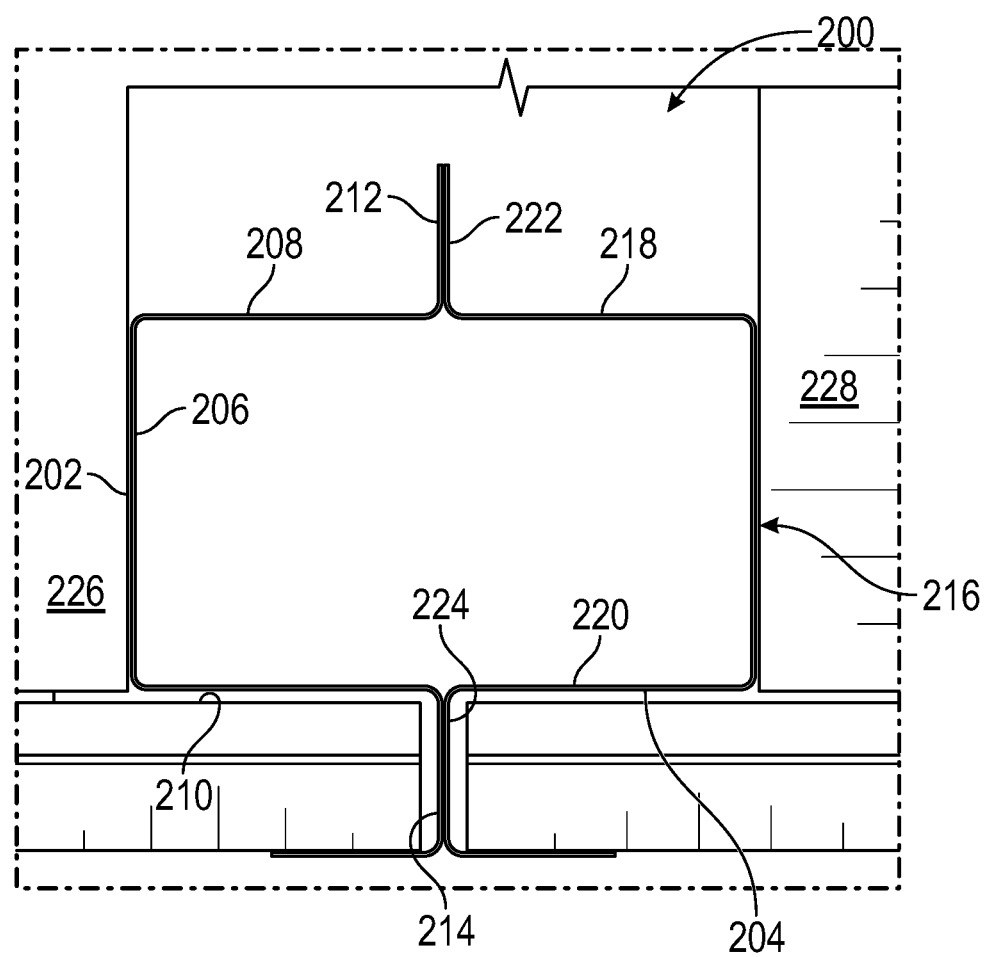
FIG. 7 is a schematic, top view of the tower side casing seal depicted in FIG. 6 in accordance with an embodiment of the present invention.
Figure 8:
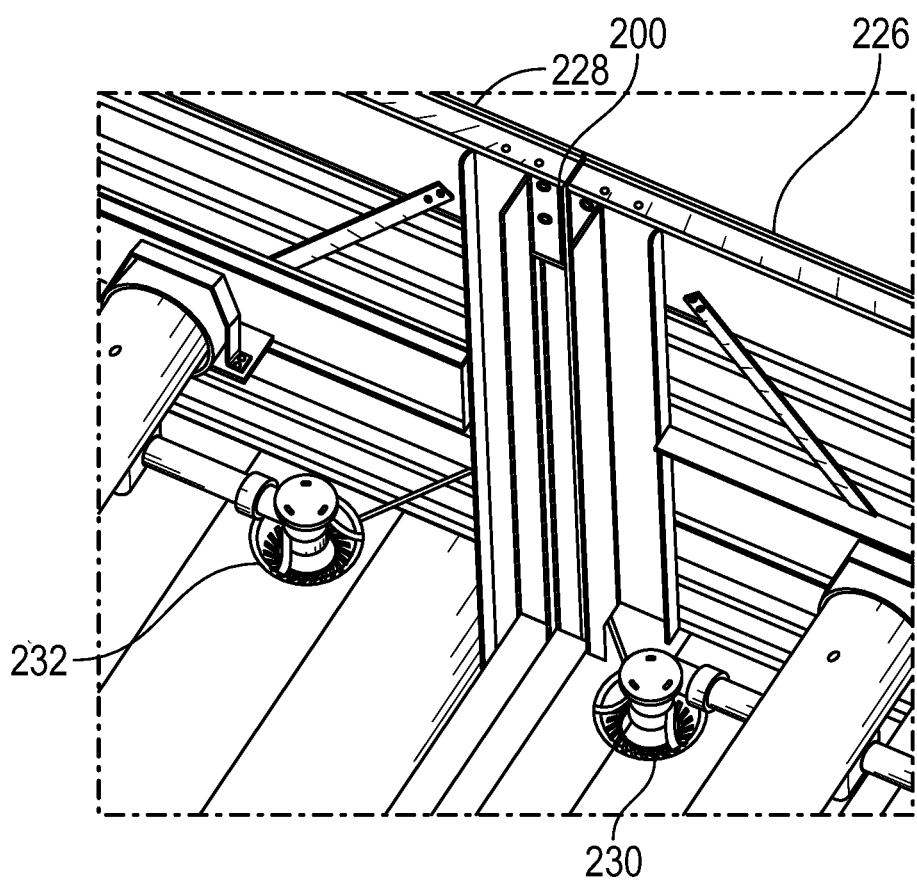
FIG. 8 is a perspective view of the tower side casing seal depicted in FIG. 6 in accordance with an embodiment of the present invention.

Turning now to FIGS. 6-8, a leak free module joining detail, or casing seal 200 is depicted. Generally speaking, the casing seal 200 is not employed to prevent leakage between abutting modules near the outboard faces of the tower but rather to provide a path for the water that penetrates the joint to fall harmlessly into the cold water basin of the tower.

FIGS. 6-8 illustrate the casing seal 200 preferably having a rectilinear geometry comprising a first shell 202 and a second shell 204. The first shell 202 includes an end wall 206 with two opposing side walls 208, 210 extending therefrom. The first opposing sidewall has a first flange 212 while the second opposing sidewall has a second flange 214. Turning to the second shell 204, it includes an end wall 216 with two opposing side walls 218, 220 extending therefrom. The first opposing sidewall has a first flange 222 while the second opposing sidewall has a second flange 224.

As can be seen in FIGS. 6-8, each of the shells 202, 204 is attached to an adjacent heat exchange modules 226, 228. Upon installation, the heat exchange modules are positioned such that they abut one another, mating the first shell 202 and the second shell 204 to form the casing seal 200 as illustrated in FIGS. 6-8. The mating of the flanges 212 to 222, provides a barrier or surface that deflects the flow of water. More specifically, as can be seen in FIG. 8, fluid to be cooled or water exits the nozzles 230, 232 radially, and fails to impact the casing seal 200 squarely in the plane of mating surfaces, but impacts the flanges 212, 222. This allows for the fluid to be retained within the modules and the fluid runoff on the fill side of said modules. As previously mentioned, this likely will not prevent leakage between abutting modules near the outboard faces of the tower at flanges 212 and 222 but rather to provide a path for the water that penetrates the joint to fall harmlessly into the cold water basin (not pictured).

Figure 9:
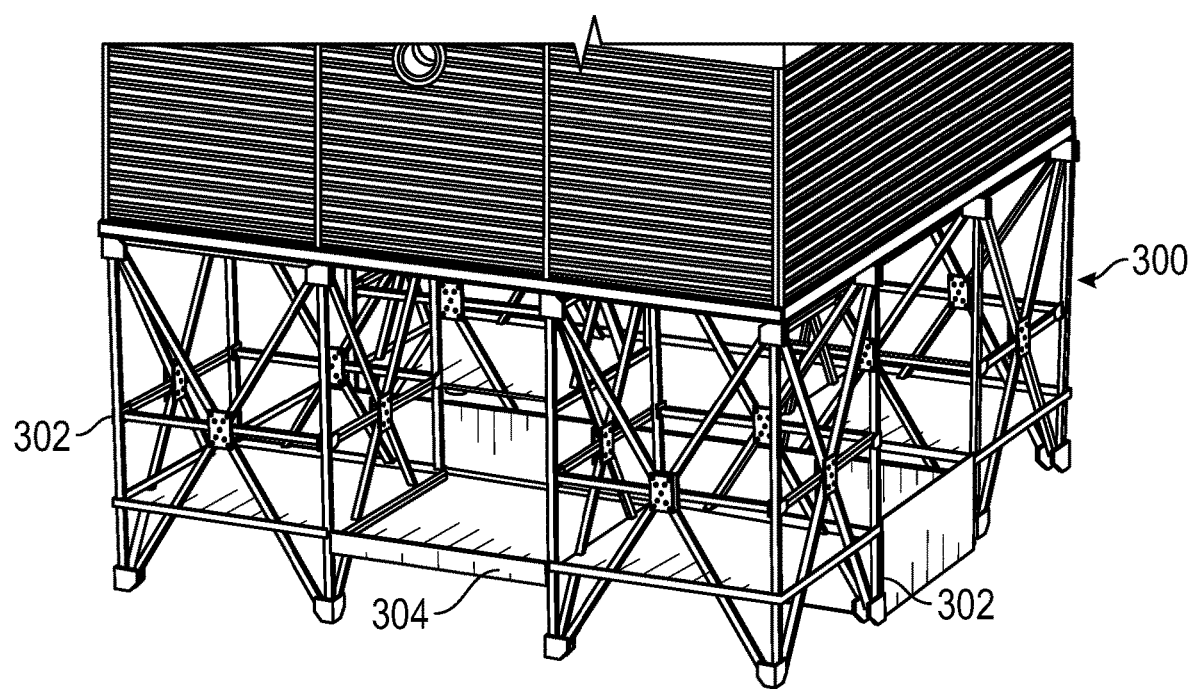
FIG. 9 is a perspective view of a cold water basin in accordance with an embodiment of the present invention.

Referring now to FIG. 9, an alternative embodiment of the present invention is depicted. As illustrated in FIG. 9, a modular cooling tower 300 have modular air inlet modules 302 having a cold water basin 304 disposed therein. While in one embodiment of the present invention, the modular cooling tower 300 is set in conventional concrete basins, the alternative embodiment illustrated in FIG. 9 employs modularized factory assembled basin 304. In the alternative embodiment depicted, some of the basin 304 portions will be attached to the air inlet modules 302 while other portions will be assemblies that will be placed between the air inlet modules 302. Those portions within the air inlet modules are elevated above the portions placed between the air inlet modules. The liquid collected within the air inlet modules then permitted to fall or weir into the lower portions between the air inlet modules. This has two advantages. Sealing between the upper and lower portions is eliminated and the total water inventory held in the basin is less thus reducing weight which can be important for roof top installations.

Figure 10:
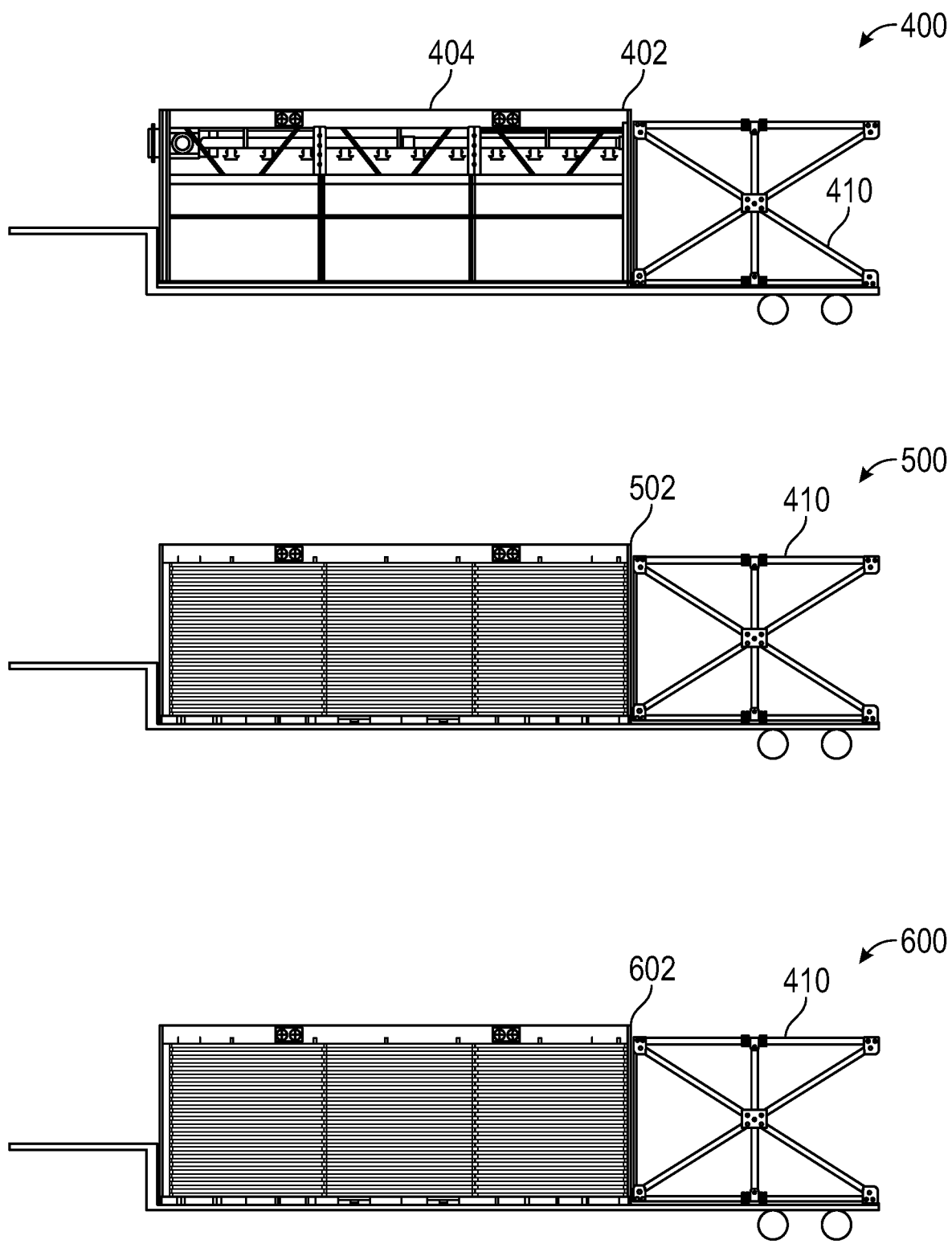
FIG. 10 is a schematic of the modular units of the heat exchange tower during transport in accordance with an embodiment of the present invention.

Turning to FIG. 10, a series of schematic depictions of the modular cooling tower during transport is illustrated. Whereas the shipping arrangement designated by reference numeral 400 depicts shipping the heat exchange module 402 the arrangements designated 500 and 600 respectively, depict the shipping of the heat exchange modules 502 and 602. Note the module 402 is an interior module with no cased walls. The eliminators described above in FIG. 2 but not shown are shown in FIG. 10 and designated 404. As illustrated in FIG. 10, each shipping arrangement 400, 500, 600 includes the preassembled air inlet modules 410 which are positioned on the unused portion of the shipping bed after the other modules are loaded. While FIG. 10 depicts the shipping of the heat exchange modules and three of the four air inlet modules, the other air inlet module would be shipped in a similar fashion with the one of the plenum modules.

During operation, hot liquid or water is sprayed via the water distribution systems such that it travels through the modular heat transfer tower in the longitudinal direction. Specifically, hot water is sprayed onto the respective fill packs of each of the heat exchange modules. As the hot water travels along the length of the individual sheets of the fill packs, it is cooled by cooler ambient air that travels into the air inlet modules and into heat exchange modules from outside of the modular heat transfer tower. Thus, when the hot water reaches the cold water basin, it has been cooled and is therefore received as cold water in the first cold water basin. The ambient air, which has been used to cool the hot water, is drawn into the plenum module and the fan module by the fan and upwards and out of the modular heat transfer tower.

To assemble the modular heat transfer tower depicted in FIG. 1, the stanchions of the air inlet modules may be positioned, and then the top layer of modules may be positioned on top of said stanchions. For example, the first, second, third and fourth air inlet module stanchions may be positioned laterally spaced apart from another. Next, the first, second and third heat exchange modules are position vertically adjacent thereon. Finally, the plenum modules are positioned vertically adjacent the heat exchange modules.

The modular heat transfer tower depicted in the figures of this application is a three (3) heat exchange modules wide tower. Nonetheless, one of ordinary skill in the art would appreciate that the module heat transfer tower 100 may comprise more or less than three heat exchange modules wide.

Figure 11:
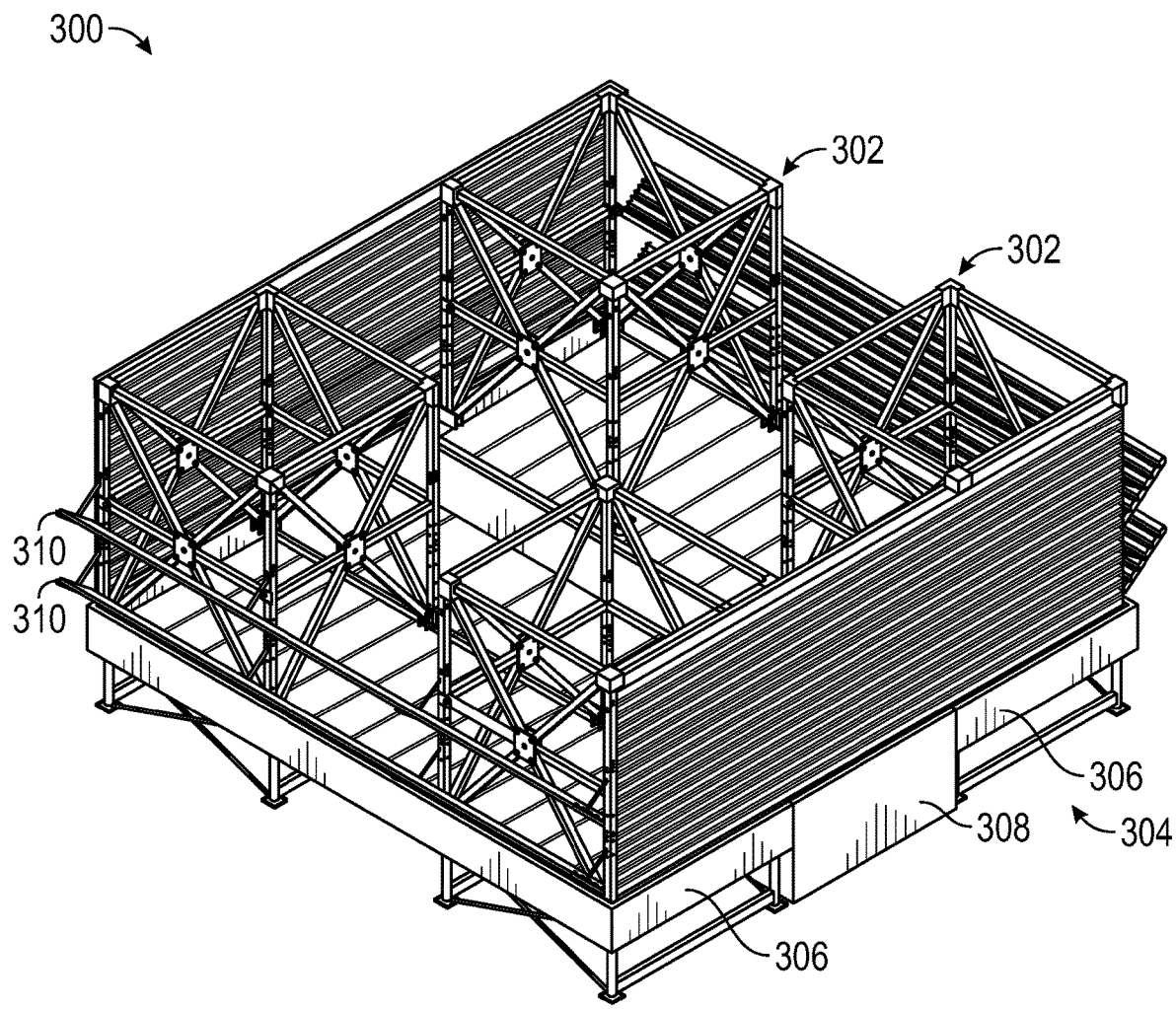
FIG. 11 is an isometric view of an air inlet modules with cold water collection basin modules in accordance with an embodiment of the present invention.

FIG. 11 is an isometric view of an air inlet modules 302 with the cold water collection basin 304 in accordance with an embodiment of the present invention. As shown in FIG. 11, the cold water collection basin 304 includes one or more cold water collection basin modules 306 and one or more cold water collection channel modules 308. In the particular example shown, there are three modules—two cold water collection basin modules 306 and one cold water collection channel module 308. In other examples shown herein, the cold water collection basin 304 may include any suitable number of cold water collection basin modules 306 and cold water collection channel modules 308. The cold water collection basin modules 306 are elevated collection modules that serve to collect water raining down from the tower heat exchange modules above and feed water to adjacent modules. The cold water collection channel modules 308 are collector channel modules that accept water from adjacent elevated cold water collection basin modules 306 as well as water raining down from heat exchange modules above.

A key feature of this cold water collection basin 304 design is minimal sealing in the field which reduces the risk of basin leaks. The old water collection basin modules 306 have lips that overlap an adjacent collector channel module. See FIGS. 17 and 18. Water is permitted to free fall off of this lip into the cold water collection channel modules 308. See FIG. 18.

The cold water collection basin 304 depictions do not show a basin water outlet which is understood by those skilled in the art. The water outlet may take the form of a depressed sump with outlet piping leading to a pump, a side outlet with a suction hood again with piping leading to a pump, a weir that permits outflowing water into a separate collection pump structure, etc.

Figure 12:
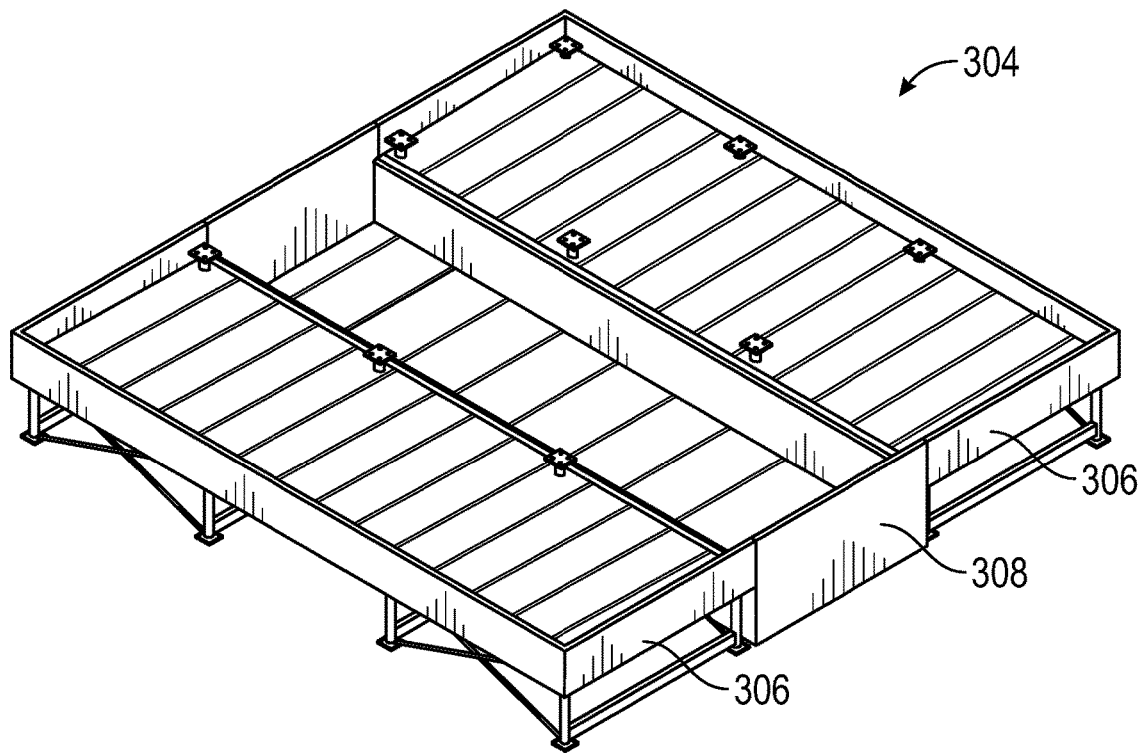
FIG. 12 is an isometric view of the cold water collection basin modules in accordance with an embodiment of the present invention.
Figure 13:
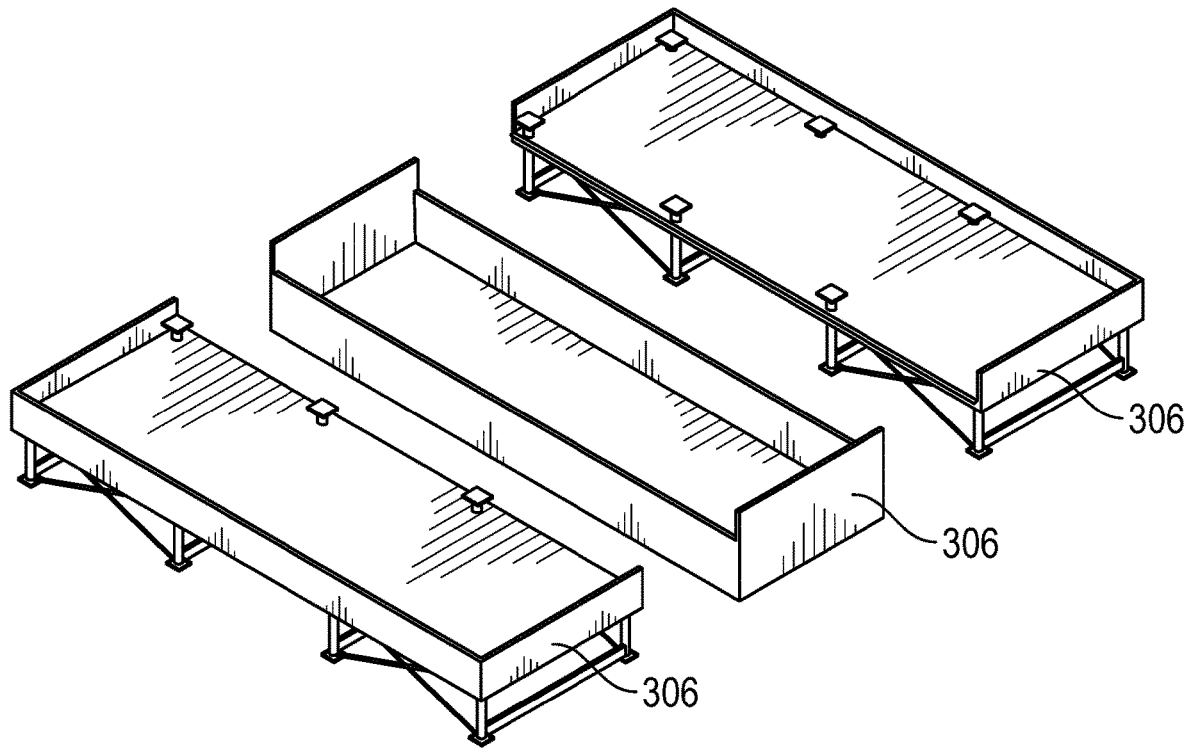
FIG. 13 is an exploded isometric view of the cold water collection basin modules in accordance with an embodiment of the present invention.

FIG. 12 is an isometric view of the cold water collection basin modules in accordance with an embodiment of the present invention and FIG. 13 is an exploded isometric view of the cold water collection basin modules in accordance with an embodiment of the present invention. As shown in FIGS. 12 and 13, each module may be free-standing and readily transportable to a site location for assembly.

Figure 14:
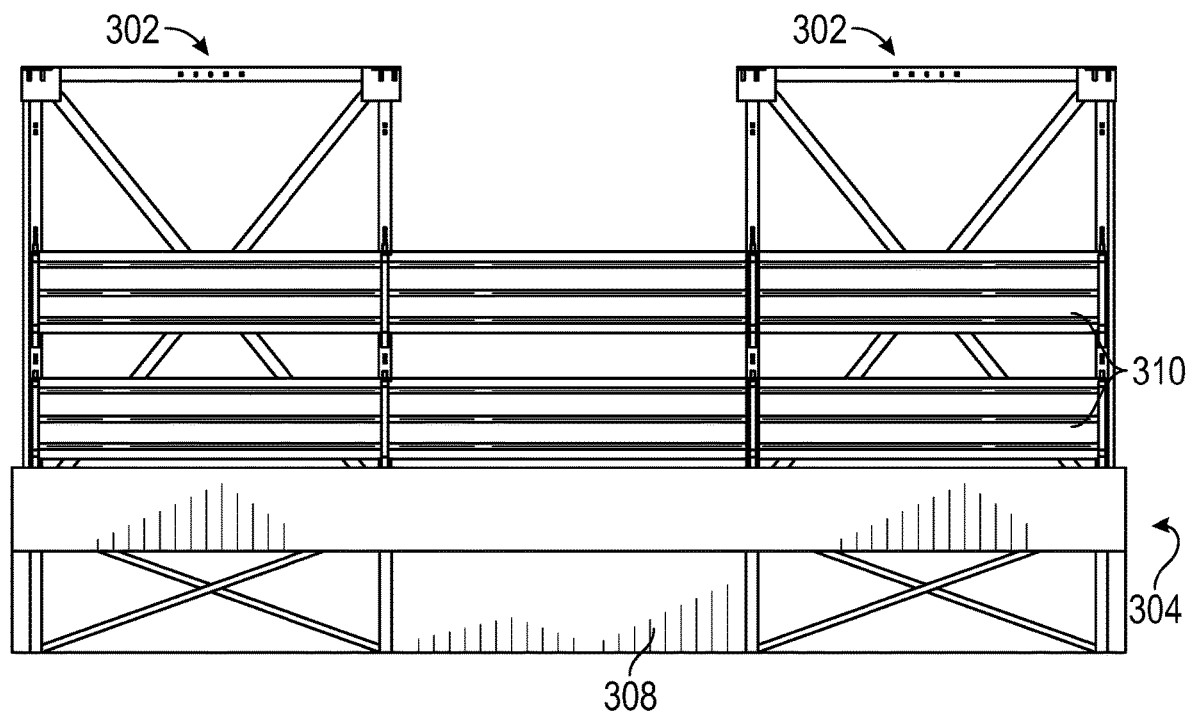
FIG. 14 is a side view of the air inlet modules with cold water collection basin modules in accordance with an embodiment of the present invention.
Figure 15:
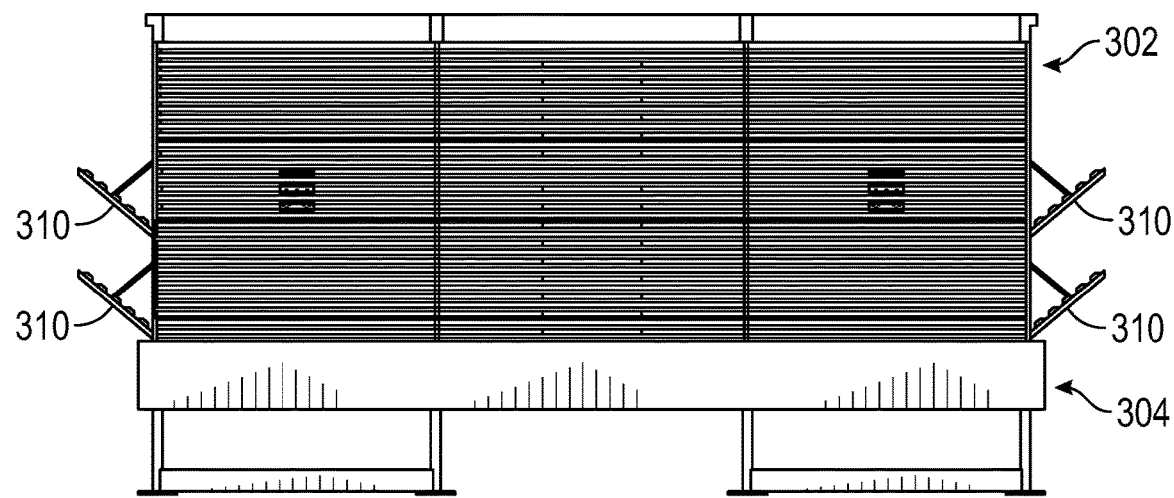
FIG. 15 is an end view of the air inlet modules with cold water collection basin modules in accordance with an embodiment of the present invention.

FIG. 14 is a side view of the air inlet modules 302 with the cold water collection basin modules 306 in accordance with an embodiment of the present invention and FIG. 15 is an end view of the air inlet modules 302 with cold water collection basin modules 306 in accordance with an embodiment of the present invention. As shown in FIGS. 14 and 15, air entering the air inlet modules 302 is drawn in from the sides and across the cold water collection basin modules 306 toward the cold water collection channel module 308. In this manner, water loss due to spray and/or spillage is reduced and the flow of water toward the cold water collection channel module 308 is facilitated by the air flow.

Figure 16:
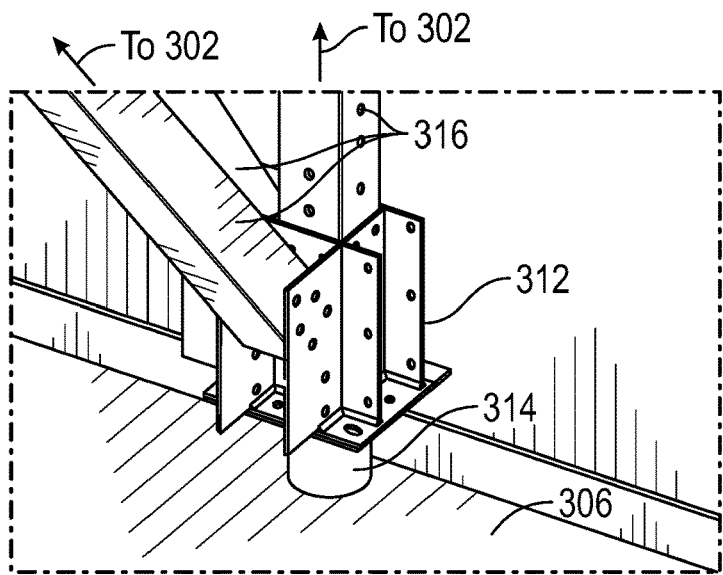
FIG. 16 is an isometric view of a weldment to attach and elevate the air inlet modules in accordance with an embodiment of the present invention.

FIG. 16 is an isometric view of a weldment 312 to attach and elevate the air inlet modules 302 in accordance with an embodiment of the present invention. As shown in FIG. 16, the weldment 312 is disposed upon an anchorage pedestal 314 which, in turn, is disposed upon a floor of the cold water collection basin module 306. The weldment 312 is configured to tie together the various supports 316 for the air inlet modules 302. Elevating the weldment 312 is configured to increase longevity of the weldment 312, reduce disruption of water flow, decrease stagnation and fowling of the water, and the like.

Figure 17:
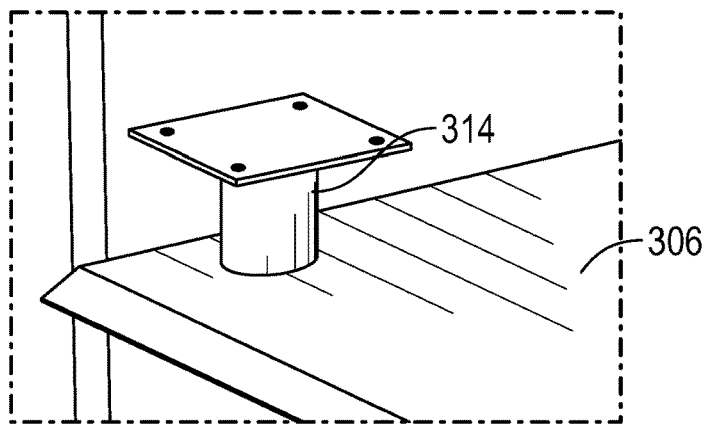
FIG. 17 is an isometric view of an anchorage pedestal for the air inlet modules in accordance with an embodiment of the present invention.

FIG. 17 is an isometric view of the anchorage pedestal 314 for the air inlet modules in accordance with an embodiment of the present invention. As shown in FIG. 17, the anchorage pedestal 314 is disposed upon a floor of the cold water collection basin module 306. The anchorage pedestal 314 may be affixed in any suitable manner such as, for example, welded, bolted, mated to a boss or other attachment point, and the like. In other examples, the anchorage pedestal 314 may be an upper portion of a base support configured to pierce the floor of the cold water collection basin module 306. If so, any hole in the floor of the cold water collection basin module 306 may be sealed about the anchorage pedestal 314 via caulk, welding, or the like.

Figure 18:
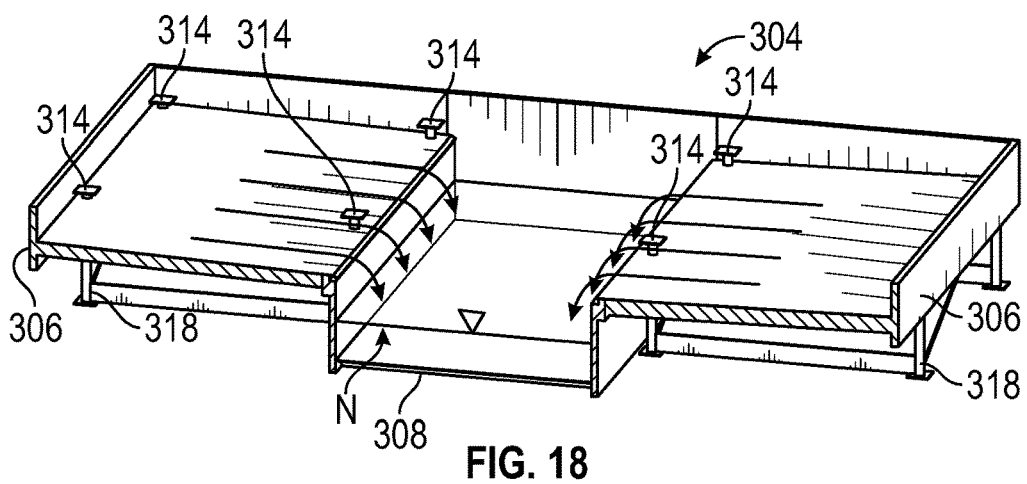
FIG. 18 is a cutaway isometric view of the cold water collection basin showing the flow of water in accordance with an embodiment of the present invention.
Figure 19:
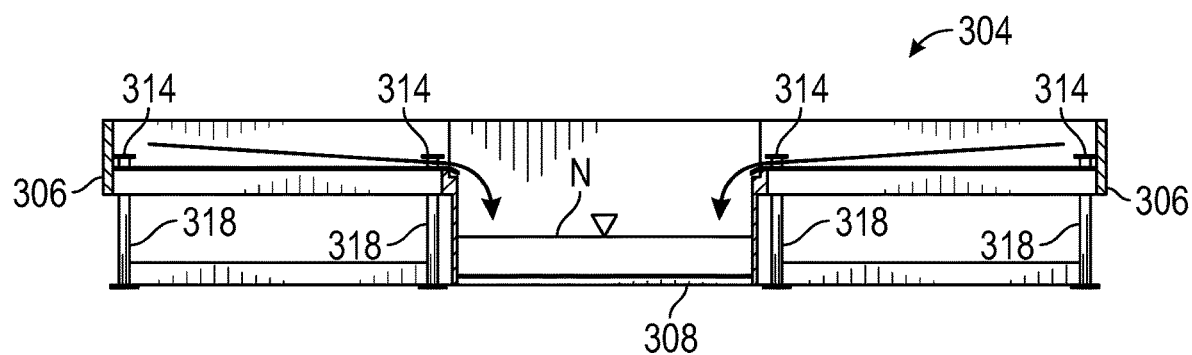
FIG. 19 is a cutaway side view of the cold water collection basin showing the flow of water in accordance with an embodiment of the present invention.

FIGS. 18 and 19 are views of the cold water collection basin 304 showing the flow of water in accordance with an embodiment of the present invention. As shown in FIG. 17, the collected water flows from the cold water collection basin module 306 to the cold water collection channel module 308. To facilitate flow from the cold water collection basin module 306 to the cold water collection channel module 308, the cold water collection basin module 306 may be sloped downward toward the cold water collection channel module 308. Water flowing into the cold water collection channel module 308 may be maintained at a normal operating water level "N" as shown. Also shown are a network of grillage beams or piers 318 disposed in cooperative alignment with the anchorage pedestals 314 to facilitate load transfer from the ground to the modules of the modular cooling tower 300 shown in FIG. 11.

Figure 20:
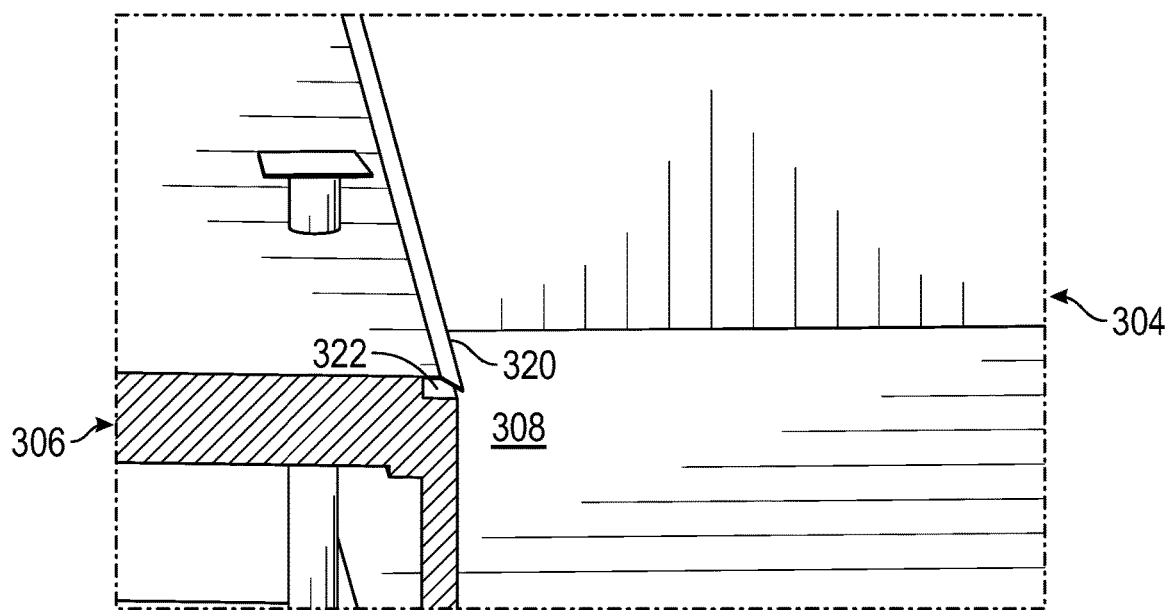
FIG. 20 is a cutaway isometric view of the cold water collection basin showing a lip extending over a collection channel of the cold water basin module in accordance with an embodiment of the present invention.
Figure 21:
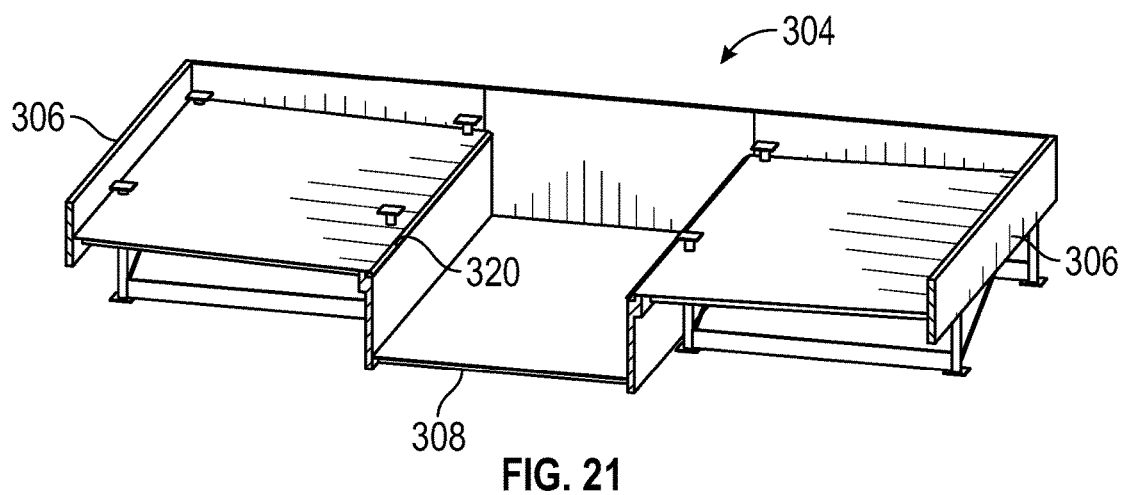
FIG. 21 is a cutaway isometric view of the cold water collection basin showing the lip extending over a collection channel of the cold water basin module in accordance with an embodiment of the present invention.
Figure 22:
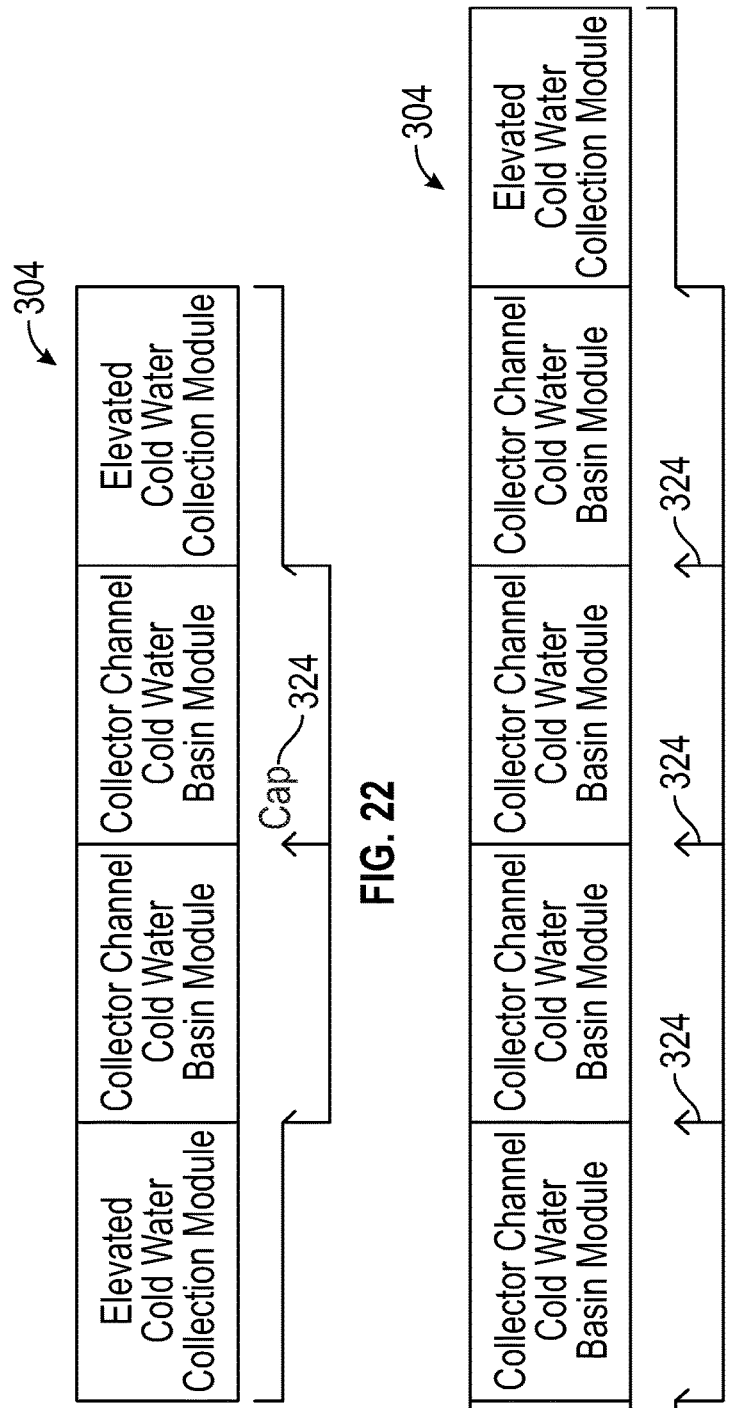
FIG. 22 is a schematic of a four module wide cold water basin in accordance with an embodiment of the present invention.
Figure 23:
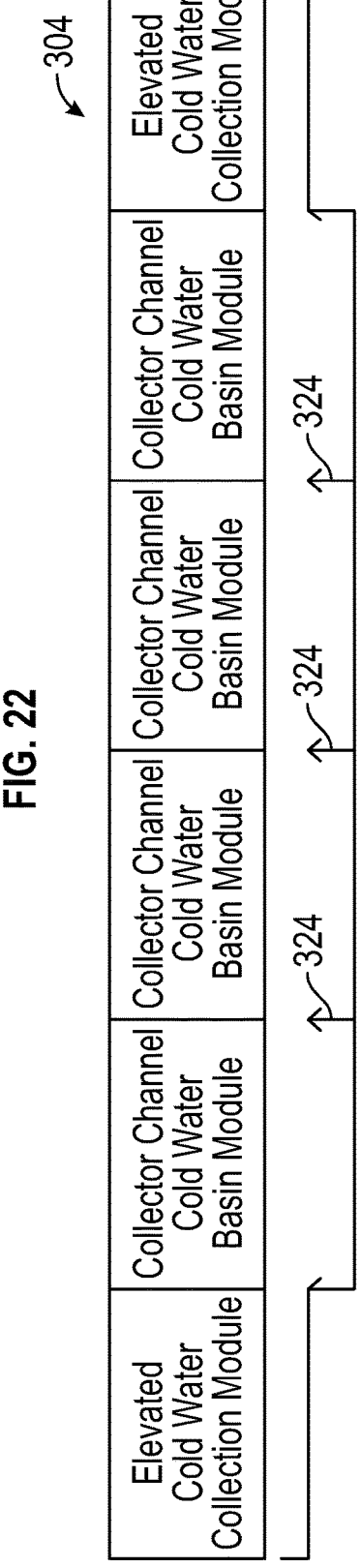
FIG. 23 is a schematic of a six module wide cold water basin in accordance with an embodiment of the present invention.

FIGS. 20 and 21 are views of the cold water collection basin 306 showing a lip 320 extending over a collection channel 322 of the cold water collection channel module 308 in accordance with an embodiment of the present invention. As shown in FIGS. 20 and 21, the lip 320 is configured to reduce leakage at the interface between the cold water collection basin module 306 and the cold water collection channel module 308. It is a benefit of the lip 320 that post-assembly sealing operations are reduced which speeds assembly of the modules of the modular cooling tower 300 shown in FIG. 11.

Figure 24:
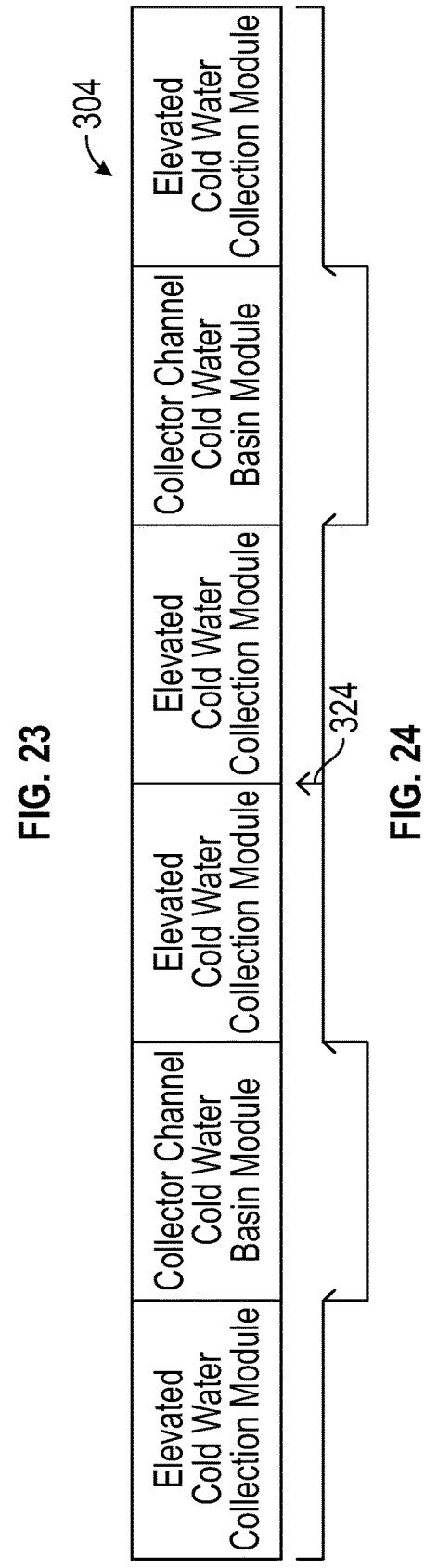
FIG. 24 is a schematic of an alternative six module wide cold water basin in accordance with an embodiment of the present invention.
Figure 25:
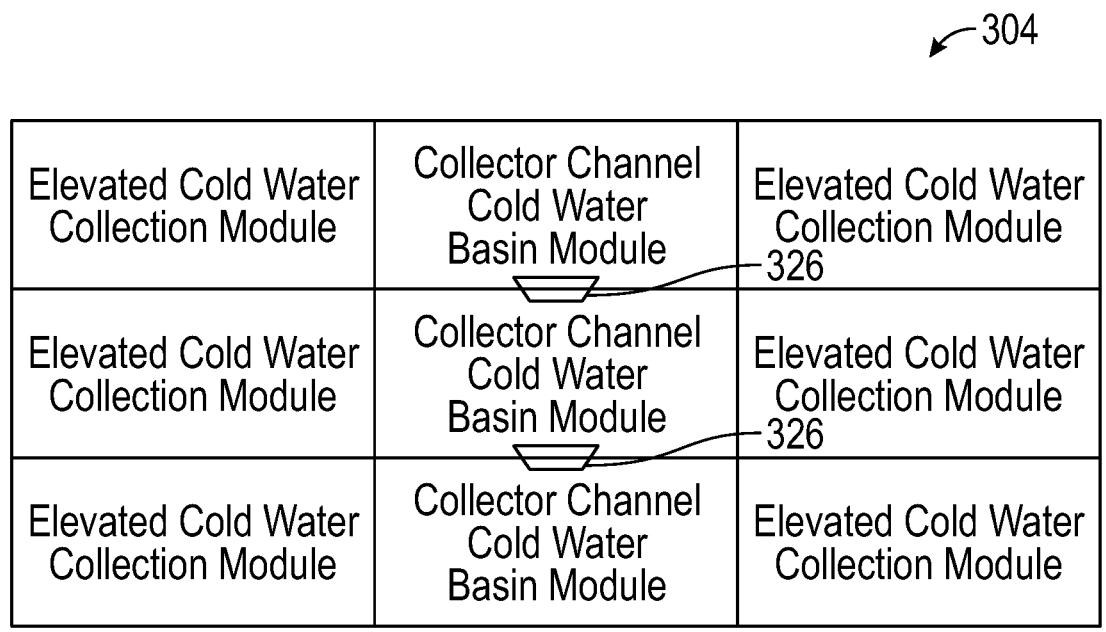
FIG. 25 is a schematic of a three cell cooling tower with a three module wide cold water basin in accordance with an embodiment of the present invention.
Figure 26:
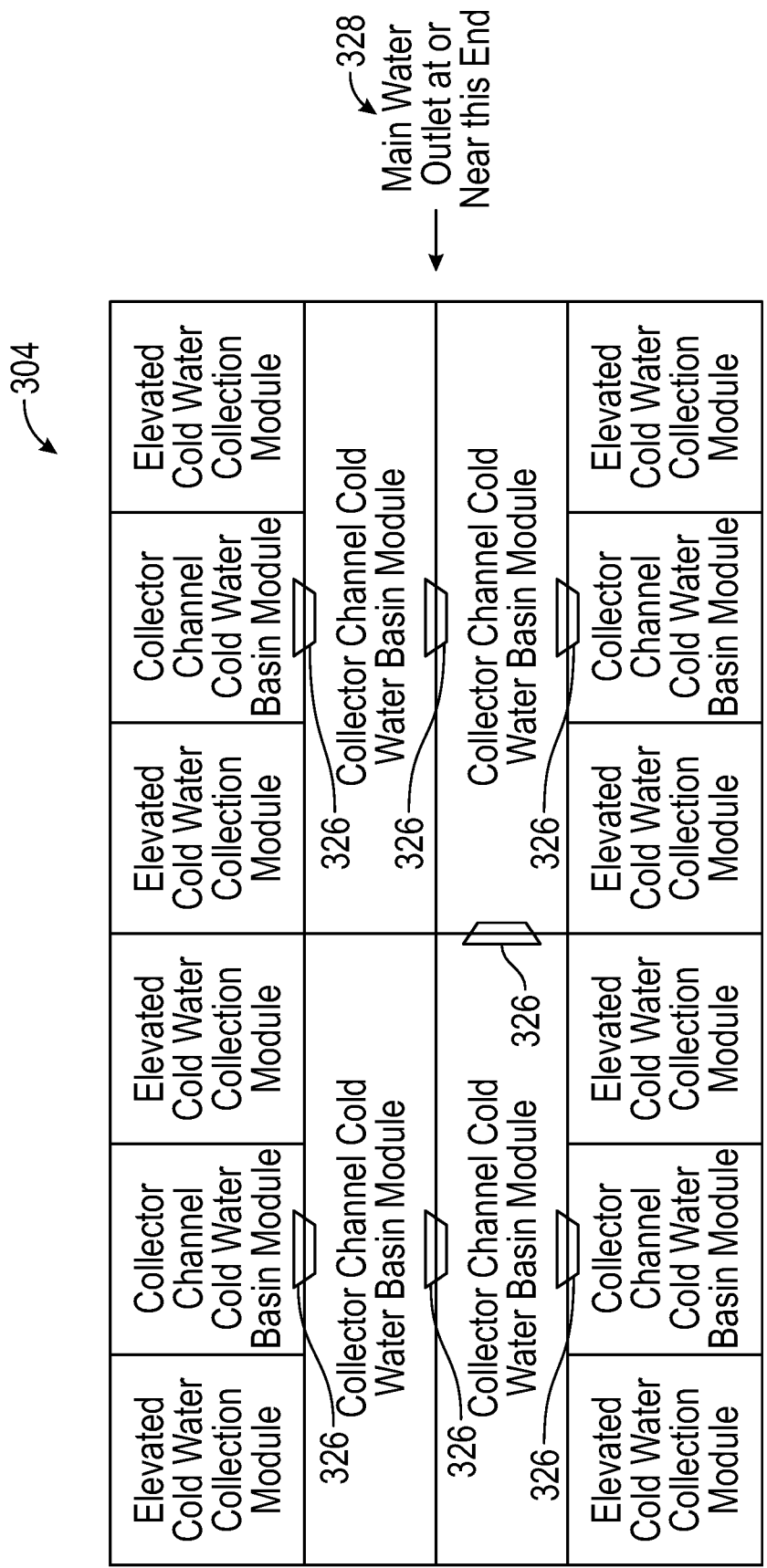
FIG. 26 is a schematic of a network of cold water basins in accordance with an embodiment of the present invention.

FIGS. 22 to 26 are schematics of the cold water collection basin 304 having various numbers of modules. For example, the cold water collection basin 304 depicted in FIG. 22 may include four modules and the cold water collection basin 304 depicted in FIG. 23 may include six modules. FIG. 24 shows an alternative six module wide cold water basin 304 in accordance with an embodiment of the present invention. A benefit of the conformation shown in FIG. 24 is that cold water inventory may be reduced relative to other conformations. These and other examples illustrate the flexibility of the modular system to provide the cooling capacity as needed. That is, any suitable number of cold water collection channel modules 308 can be placed adjacent to one another. Note that a cap 324 or other falling water diverting device may be placed over the interface between two cold water collection channel modules 308 to prevent leakage between the adjacent cold water collection channel modules 308. Furthermore the orientation of modules may be in the longitudinal or transverse directions (essential rotated 90 degrees for what is shown). Or a combination of orientations such as shown in FIG. 26.

In yet another example, FIG. 25 shows a three cell cooling tower with a three module wide cold water basin 304 in accordance with an embodiment of the present invention. As shown in FIG. 25, the cold water basin 304 may be configured to link multiple cells together. Note that the adjacent cold water collection channel modules 308 are linked together via flume connection 326 graphically depicted as a trapezoid. Examples of suitable flume connections for the flume connection 326 are shown and described in pending U.S. patent application Ser. No. 15/269,386 also published as US20170343306A1, the disclosure of which is hereby incorporated in this application by reference.

FIG. 26 is a schematic of a network of cold water basins 304 in accordance with an embodiment of the present invention. As shown in FIG. 26, the cold water basin 304 may be configured to link multiple cells together to form an extensive water collection network having a single water exit 328.

Figure 27:
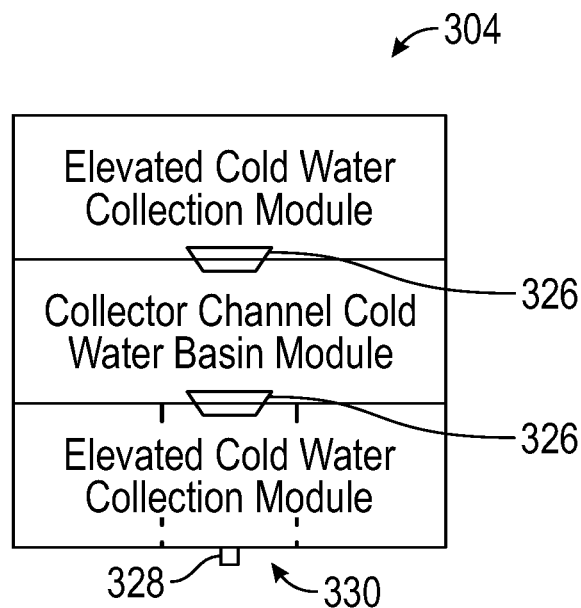
FIG. 27 is a schematic plan view of a cold water collection basin with additional water reserve in accordance with an embodiment of the present invention.
Figure 28:
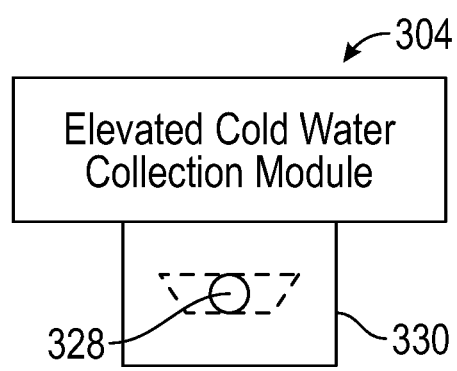
FIG. 28 is a schematic side view of the cold water collection basin with additional water reserve in accordance with an embodiment of the present invention.

FIGS. 27 and 28 are views of a cold water collection basin 304 with additional water reserve 330 in accordance with an embodiment of the present invention. As shown in FIGS. 27 and 28, the water reserve 330 may be disposed below the cold water collection channel modules 308 and configured to maintain a reserve of water. In some examples, the water exit 328 may drain from the water reserve 330.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example an induced draft heat exchanger has been illustrated but a forced draft design can be adapted to gain the same benefits and, accordingly, all suitable modifications and equivalents may be resorted to that fall within the scope of the invention. As noted above, another example is replacing one or more of the modules containing fill with modules that may include closed circuit coils or tube bundles for cooling and/or condensing fluids. In yet another example one or more modules may include fill and closed circuit coils, tube bundles, or splash bars.

Another construction in the spirit of the scope of this invention is to add more modules in plan view. For example a tower of approximately twice the cooling capacity could be comprised of twice as many air inlet modules, twice as many heat exchange modules and twice as many plenum and fan modules. More than twice as many plenum and fan modules may be desirable to replace a larger diameter fan. Furthermore, in an example having an odd number of plenum and fan modules, it may be desirable to have a central module that contains the fan mechanical equipment, particularly the motor, gearbox, and fan hub.

Yet another construction is spirit of the scope of this invention is to add more modules vertically. For example additional modules with heat exchangers could be placed between the collection modules and the heat exchange modules as previously described. Additional modules between the plenum modules and the fan modules can be placed to compliment taller overall heat exchanger assemblies.

What is claimed is:

1. A modular heat exchange tower that extends vertically along a longitudinal axis, comprising:
   a first air inlet module comprising a first stanchion;
   a second air inlet module comprising a second stanchion;
   a third air inlet module comprising a third stanchion;
   a fourth air inlet module comprising a fourth stanchion;
   a first heat exchange module, wherein said first heat exchange module is positioned vertically adjacent and spans said first and said second air inlet modules;
   a second heat exchange module, wherein said second heat exchange module is positioned vertically adjacent and spans said third and said fourth air inlet modules; and
   a first plenum module positioned vertically adjacent the first heat exchange module and said second heat exchange module along the longitudinal axis wherein said first plenum module comprises an air current generator disposed therein.

2. The modular heat exchange tower according to claim 1, further comprising:
   a third heat exchange module, wherein said third heat exchange module is positioned laterally between said first and said second heat exchange modules;
   a second plenum module positioned vertically adjacent the second heat exchange module along the longitudinal axis; and
   a third plenum module positioned vertically adjacent the third heat exchange module along the longitudinal axis.

3. The modular heat exchange tower according to claim 2, wherein said first, second, third and fourth air inlet modules are factory assembled.

4. The modular heat exchange tower according to claim 3, wherein said first heat exchange module comprises a first liquid distribution system; said second heat exchange module comprises a second liquid distribution system; and said third heat exchange module comprises a third liquid distribution system.

5. The modular heat exchange tower according to claim 4, wherein said first heat exchange module comprises a first fill section; said second heat exchange module comprises a second fill section; and said third heat exchange module comprises a third fill section.

6. The modular heat exchange tower according to claim 5, wherein said first heat exchange module comprises a first drift eliminator disposed above said first liquid distribution system; said second heat exchange module comprises a second drift eliminator disposed above said second liquid distribution system; and said third heat exchange module comprises a third drift eliminator disposed above said third liquid distribution system.

7. The modular heat exchange tower according to claim 5, wherein each of said first, second and third liquid distribution systems comprise a plurality of nozzles.

8. The modular heat exchange tower according to claim 5, wherein each of said first, second and third fill sections is counterflow fill.

9. The modular heat exchange tower according to claim 1, further comprising:

a first cold water basin disposed within said first stanchion;
a second cold water basin disposed within said second stanchion;
a third cold water basin disposed within said third stanchion; and
a fourth cold water basin disposed within said fourth stanchion.

10. The modular heat exchange tower according to claim 1 wherein said air current generator is a fan assembly.

11. The modular heat exchange tower according to claim 1, further comprising:
a modular cold water collection basin, the modular cold water collection basin comprising:
a cold water collection basin module; and
a cold water collection channel module.

12. The modular heat exchange tower according to claim 11, wherein the cold water collection basin module is elevated relative to the cold water collection channel module and the cold water collection basin module includes a lip disposed at an interface between the cold water collection basin module and the cold water collection channel module, the lip being configured to facilitate a flow of water from the cold water collection basin module to the cold water collection channel module.

13. A heat exchange tower that extends vertically along a longitudinal axis, comprising:
a first stanchion
a second stanchion;
a third stanchion; and
a fourth stanchion;
a first heat exchange module, wherein said first heat exchange module is positioned vertically adjacent and spans said first and said second stanchions;
a second heat exchange module, wherein said second heat exchange module is positioned vertically adjacent and spans said third and said fourth stanchions;
a third heat exchange module, wherein said third heat exchange module is positioned laterally between said first and said second heat exchange modules;
a first plenum module positioned vertically adjacent the first heat exchange module along the longitudinal axis;
a second plenum module positioned vertically adjacent the second heat exchange module along the longitudinal axis; and
a third plenum module positioned vertically adjacent the third heat exchange module along the longitudinal axis, wherein said third plenum module comprises an air current generator disposed therein.

14. The heat exchange tower according to claim 13, wherein said first heat exchange module comprises a first liquid distribution system; said second heat exchange module comprises a second liquid distribution system; and said third heat exchange module comprises a third liquid distribution system.

15. The modular heat exchange tower according to claim 14, wherein said first heat exchange module comprises a first fill section; said second heat exchange module comprises a second fill section; and said third heat exchange module comprises a third fill section.

16. The modular heat exchange tower according to claim 15, wherein said first heat exchange module comprises a first drift eliminator disposed above said first liquid distribution system; said second heat exchange module comprises a second drift eliminator disposed above said second liquid distribution system; and said third heat exchange module comprises a third drift eliminator disposed above said third liquid distribution system.

17. The modular heat exchange tower according to claim 16, wherein each of said first, second and third liquid distribution systems comprise a plurality of nozzles.

18. The modular heat exchange tower according to claim 17, wherein each of said first, second and third fill sections is counter flow fill.

19. The modular heat exchange tower according to claim 13, further comprising:
a modular cold water collection basin, the modular cold water collection basin comprising:
a cold water collection basin module; and
a cold water collection channel module.

20. The modular heat exchange tower according to claim 19, wherein the cold water collection basin module is elevated relative to the cold water collection channel module and the cold water collection basin module includes a lip disposed at an interface between the cold water collection basin module and the cold water collection channel module, the lip being configured to facilitate a flow of water from the cold water collection basin module to the cold water collection channel module.

* * * * *